United States Patent [19]
Friend et al.

[11] Patent Number: 6,113,108
[45] Date of Patent: Sep. 5, 2000

[54] BUFFER SEAL

[75] Inventors: Anthony D. Friend, Peoria; Donald S. Jackson, Pekin; Mark J. Kiesel, Peoria, all of Ill.

[73] Assignee: Caterpillar Inc., Peoria, Ill.

[21] Appl. No.: 09/038,524

[22] Filed: Mar. 11, 1998

[51] Int. Cl.[7] .................................................. F16J 15/32
[52] U.S. Cl. .................... 277/549; 277/552; 277/560; 277/584
[58] Field of Search ................................. 277/558, 436, 277/468, 552, 563, 549, 560, 569, 584

[56] References Cited

U.S. PATENT DOCUMENTS

| | | | |
|---|---|---|---|
| 4,284,280 | 8/1981 | Bertram et al. | 277/558 |
| 4,350,347 | 9/1982 | Heinrich | 277/549 |
| 4,921,258 | 5/1990 | Fournier et al. | 277/29 |
| 4,944,498 | 7/1990 | Körtgen et al. | 267/64 |
| 5,088,745 | 2/1992 | Peppiatt et al. | 277/214 |
| 5,139,274 | 8/1992 | Oseman | 277/58 |
| 5,169,160 | 12/1992 | Gaskill et al. | 277/68 |

FOREIGN PATENT DOCUMENTS

| | | |
|---|---|---|
| 0299431 | 7/1988 | European Pat. Off. . |
| 0427554 | 11/1990 | European Pat. Off. . |
| 28 45 920 | 3/1980 | Germany . |
| 2219050 | 11/1989 | United Kingdom . |

*Primary Examiner*—Anthony Knight
*Assistant Examiner*—Vishad Patel
*Attorney, Agent, or Firm*—J. W. Burrows; Jenkens & Gilchrist

[57] ABSTRACT

A buffer seal is provided and adapted to absorb high pressures. The buffer seal includes a body portion and a sealing portion with a backup ring disposed in a groove adjacent to the sealing portion. The sealing portion has a first surface that is perpendicular to a reference axis of the buffer seal and a second surface that forms an acute angle with the reference axis, preferably less than thirty degrees. The first surface of the sealing portion extends axially from the body portion to form a shoulder. The shoulder functions during use to provide a surface that pressurized fluid can act against to urge the sealing portion against a shaft.

7 Claims, 4 Drawing Sheets

6,113,108

BUFFER SEAL

TECHNICAL FIELD

This invention relates generally to a buffer seal for absorbing high pressures between a source of high pressure and adjacent seals and more particularly to a buffer seal that more effectively absorbs the high pressures and provides greater durability and reliability.

BACKGROUND ART

Many known buffer seals include urethane rings having rectangular or near rectangular cross-sectional shapes for providing bi-directional sealing. These buffer seals have a tendency to trap hydraulic fluid or oil between themselves and adjacent sealing rings. This trapped fluid or oil at times reaches pressure levels that are sufficient to damage both the buffer seal and the adjacent seals. Other known buffer seals use backup non-extrusion rings in a groove behind the sealing surface but the sealing surface of these known buffer seals tend to extrude into the area between the backup ring and the shaft being sealed. Many other seals having backup rings have been use to provide sealing between a seal and a shaft without the use of buffer seals. These known seals, when used without a buffer seal, are normally rather bulky in size when being used in high pressure applications and normally have large surfaces that are exposed to the high pressure to obtain pressure activation of the sealing surface. If the pressure activation force becomes to high the oil film on the shaft is forced away and the shaft and/or seal becomes worn due to the frictional interference therebetween.

The subject invention is directed to overcoming one or more of the problems as set forth above.

DISCLOSURE OF THE INVENTION

In one aspect of the present invention a buffer seal is provided and defines a reference axis. The buffer seal is adapted to be disposed in a groove of a housing to prevent high pressure from passing between the buffer seal and a shaft disposed therethrough. The buffer seal includes a body portion having an outer peripheral portion that is parallel with the reference axis, an inner peripheral portion, a first radial face and a second radial face. A sealing portion is connected to the inner peripheral portion of the body portion. The sealing portion has a first surface perpendicular to the reference axis and spaced in an axial direction away from the first radial face to form a shoulder. A second surface is provided and oriented at an acute angle with respect to the reference axis and the apex of the formed angle between the first and second surfaces being the closest point of the buffer seal to the reference axis.

BEST MODE FOR CARRYING OUT THE INVENTION

Figure 1:
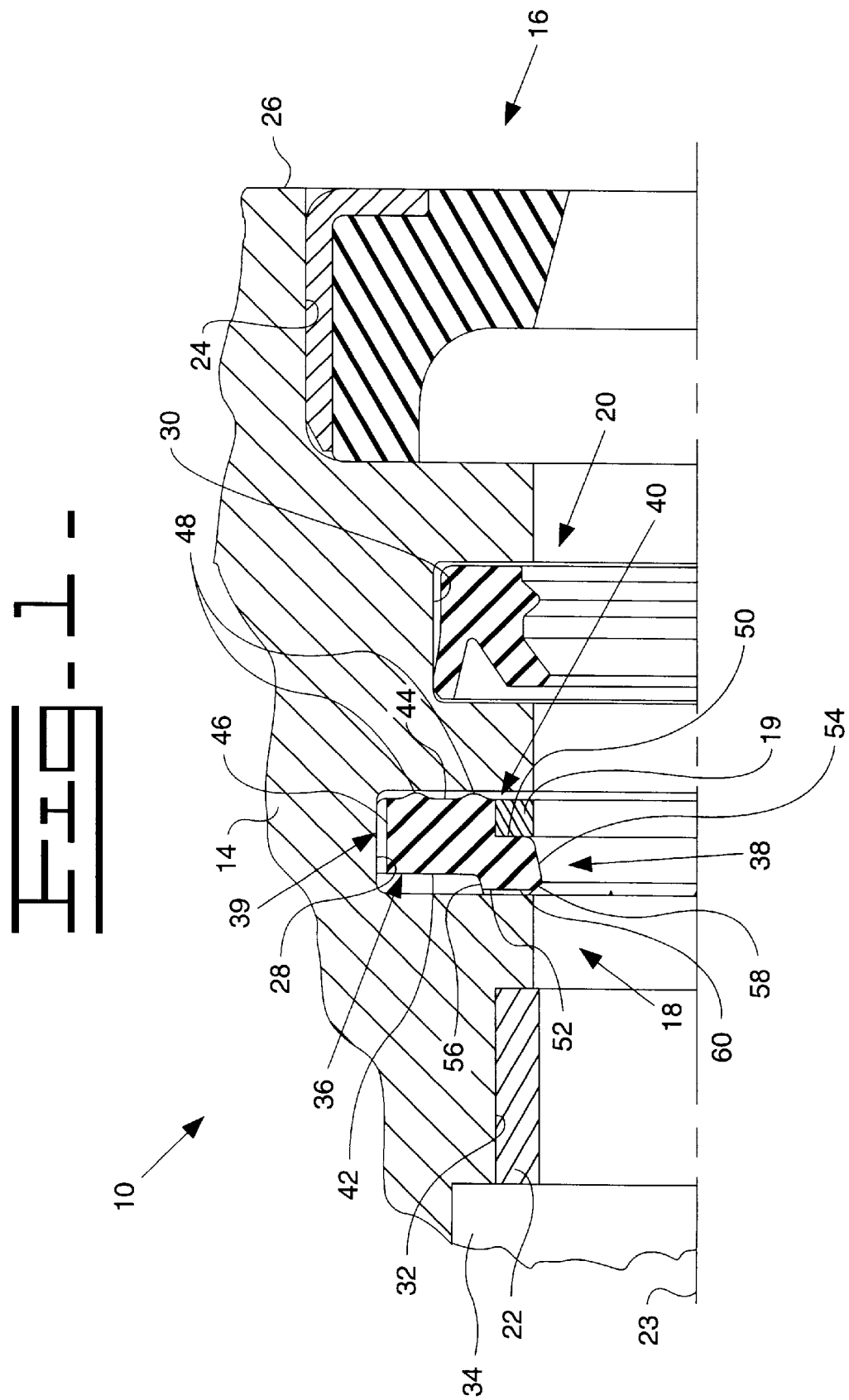
FIG. 1 is a partial section of a sealing arrangement incorporating an embodiment of the subject invention.
Figure 2:
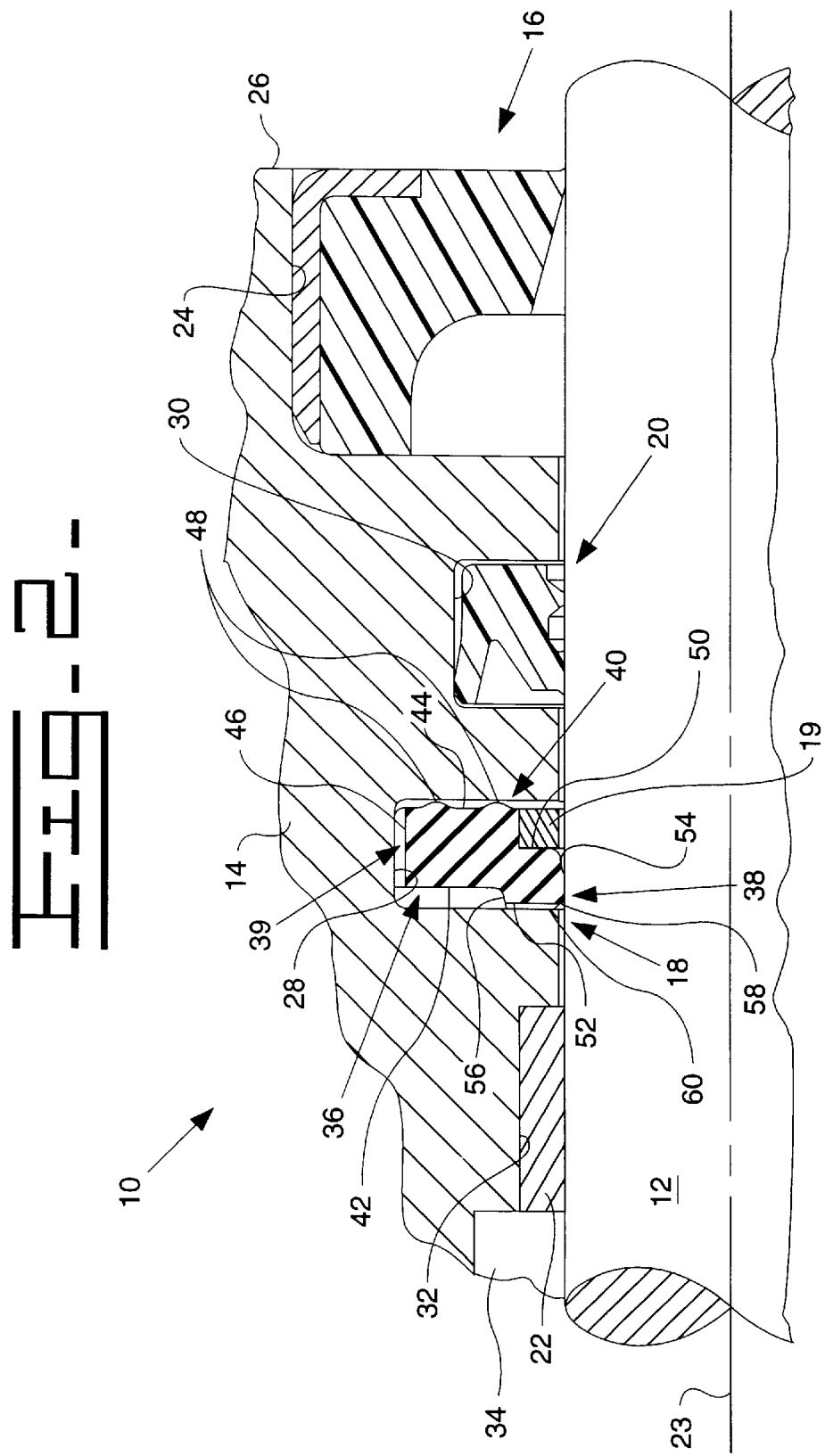
FIG. 2 is a partial section of the sealing arrangement of FIG. 1 with a shaft disposed therethrough.
Figure 3:
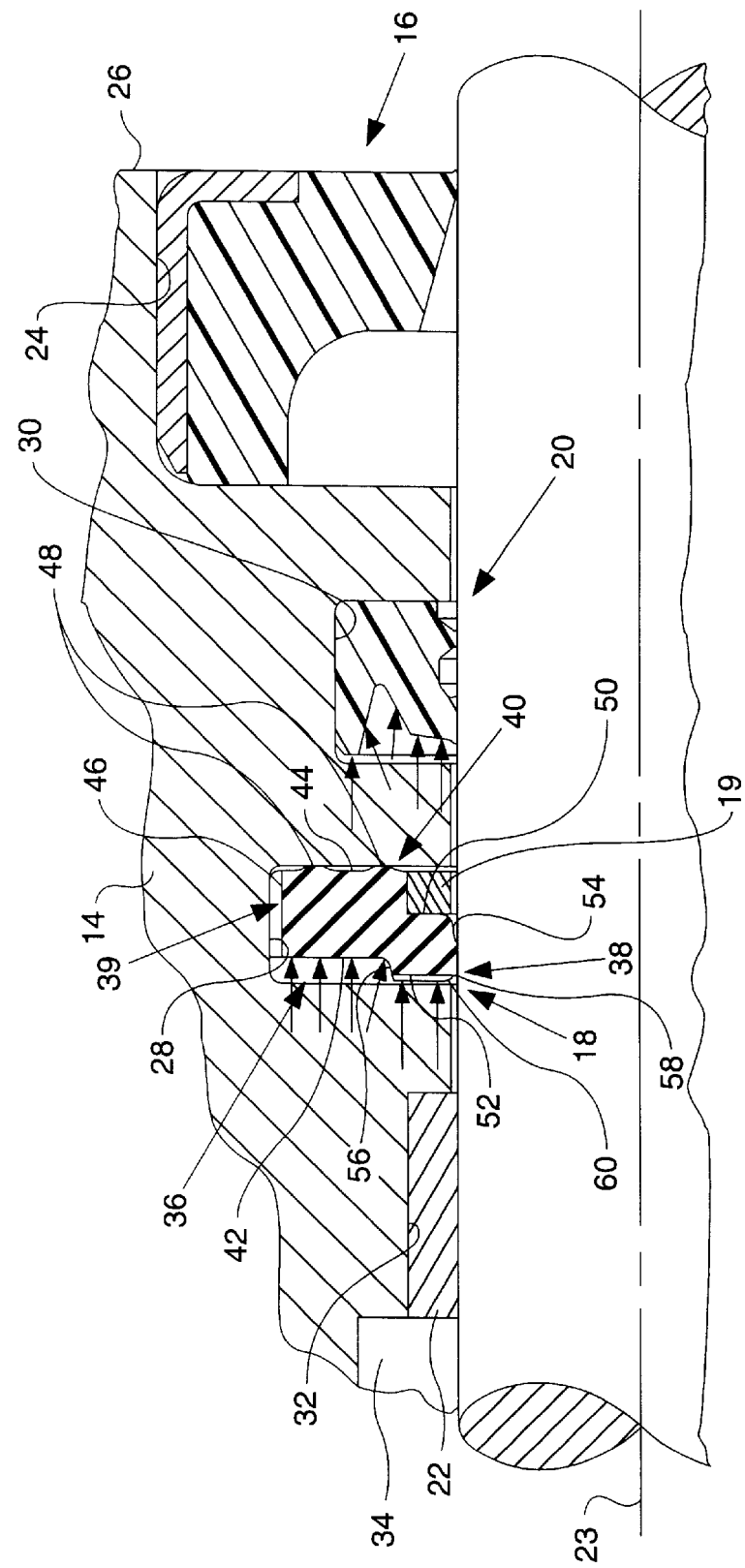
FIG. 3 is a partial section of the sealing arrangement of FIG. 2 with arrows representing the presence of pressurized fluid acting on the exposed surfaces of the seal.

Referring to the drawings and more particularly to FIG. 1,2 and 3, a sealing arrangement 10 is illustrated to provide sealing of pressurized fluid between an axially movable shaft 12 and a housing 14. The sealing arrangement includes a wiper seal 16, a buffer seal 18 having a backup ring 19, a radial lip seal 20, and a wear strip 22. The center line of the shaft 12 serves as a reference axis 23 for each of the seals 16,18,20, the wear strip 22 and the backup ring 19.

The housing 14 has a recess 24 defined in one end thereof extending inward from an end surface 26. A first groove 28 is defined in the housing and of a size to receive the buffer seal 18 and a second groove 30 is defined therein and of a size to receive the radial lip seal 20. A bore 32 is defined in the housing and receives the wear strip 22.

The wiper seal 16 is operative to clean dirt and other contaminants from the shaft 12 as it moves to the left as viewed in FIG. 2. This eliminates the possibility of the radial lip seal 20 or the buffer seal 18 being damaged by exposure to the contaminants.

The radial lip seal 20 is operative in a well known manner to prohibit the leakage of fluid from a fluid chamber 34 that contains high pressure fluid.

The buffer seal 18 is operative to absorb high pressures within the fluid chamber 34. The arrows in FIG. 3 graphically illustrate pressure acting on the respective buffer and radial lip seals 18,20. It is recognized that the buffer seal 18 is normally subjected to sudden, larger pressure levels than the radial lip seal 20, even though the radial lip seal 20 must also withstand high levels of pressure.

Referring back to FIG. 1, the buffer seal 18 is illustrated in its relaxed state without the shaft 12 being installed. The buffer seal 18 includes a body portion 36 and a sealing portion 38. The body portion 36 has an outer peripheral portion 39, an inner peripheral portion 40, a first radial face 42 and a second radial face 44. The outer peripheral portion 39 is oriented generally parallel with the reference axis 23 and has a plurality of grooves 46 spaced from one another around the circumference of the body portion 36. The grooves 46 are oriented generally parallel with the reference axis 23. The second radial face 44 has a plurality of annular raised rings 48 disposed thereon.

A groove 50 is defined in the inner peripheral portion 40 of the body portion 36 and is of a size sufficient to receive the backup ring 19. The groove 50 is located adjacent the second radial face 44.

The sealing portion 38 includes a first surface 52 and a second surface 54. The first surface 52 is perpendicular to the reference axis 23 and extends in an axial direction from the body portion 36 to form a shoulder 56 with the body portion 36. The second surface 54 forms an acute angle with respect to the reference axis 23 and preferably less than thirty degrees. The apex of the first and second surfaces 52,54 is at a location closest to the reference axis than the rest of the buffer seal 18. The other end of the second surface terminates at the groove 50.

The sealing portion 38 of the subject embodiment also includes a third surface 58 that extends from the first surface 52 to the second surface 54. The intersection of the third surface 58 with the second surface 56 is generally adjacent the perpendicular first surface 52.

A plurality of grooves 60 are defined in the first surface 52 of the sealing portion 38. The plurality of grooves 60 are spaced from one another around the face of the first surface 52 and extend radially outward from the reference axis 23. Preferably, the bottom of the respective ones of the plurality of grooves 60 is axially closer to a plane defined by the first surface 52 than the point of intersection of the second and third surfaces 58.

Figure 4:
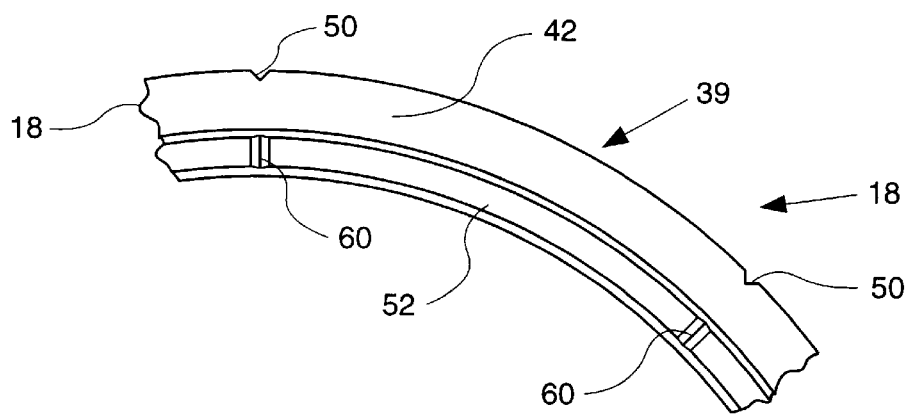
FIG. 4 is a partial circumferential section of a buffer seal from the partial section of the sealing arrangement of FIG. 1.

Referring to FIG. 4, the plurality of grooves 46 on the outer peripheral portion 39 and the plurality of grooves 60 on the first surface 52 of the sealing portion 38 are more clearly illustrated.

Figure 5:
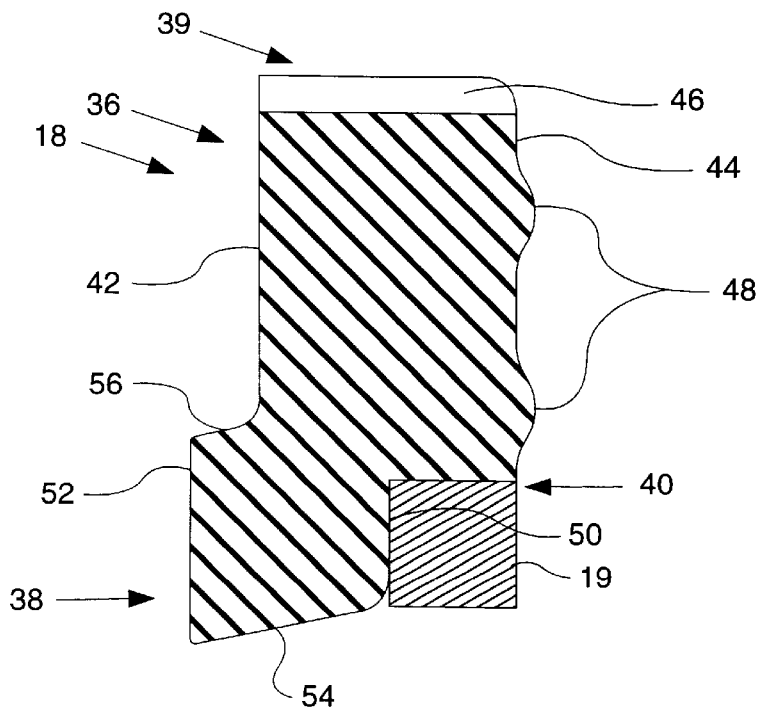
FIG. 5 is an enlarged cross-sectional view of an alternate embodiment of the buffer seal taken from the partial section of the sealing arrangement of FIG. 1.

Referring to FIG. 5, an enlarged cross-section of an alternate embodiment of the buffer seal 18 with a cross-section of the backup ring 19 is illustrated. The backup ring 19 is the same as the backup ring of the FIG. 1. The only differences between the buffer seal 18 of FIG. 1 and that of FIG. 5 is that the sealing portion 38 does not have a third surface 58 and the plurality of grooves 60 are removed. The first and second surfaces 52,54 of FIG. 5 intersect at the apex of the two surfaces which coincides with the perpendicular plane of the first surface 52.

INDUSTRIAL APPLICABILITY

In the operation of the seal arrangement of the subject invention, the buffer seal of FIG. 1 and the buffer seal of FIG. 5 perform in substantially the same manner. However, the intersection of the second and third surfaces 54,58 of the embodiment of FIG. 1 may have less tendency to extrude outwardly as compared to the intersection of the first and second surfaces 52, 54 of the embodiment of FIG. 5.

As illustrated in FIG. 2, once the shaft 12 has been inserted through the seal arrangement 10, the outer surface of the shaft 12 is in sealing engagement with the respective seals of the sealing arrangement 10. As the shaft 12 is moved to the left as viewed in the drawings, the wiper seal 16 cleans the outer surface of the shaft 12 to ensure that no contaminants are permitted to reach the radial lip seal 20 or the buffer seal 18.

As illustrated in FIG. 3, pressurized fluid within the fluid chamber 34 is first directed against the buffer seal 18 and subsequently against the radial lip seal 20. The backup ring 19 serves to resist the tendency of the sealing portion 38 to extrude in a direction towards the radial lip seal 20. The shoulder 56 serves as an effective area for the pressurized fluid to act upon to urge the sealing portion 38 into engagement with the shaft 12.

The plurality of grooves 46 in the outer peripheral 39, the plurality of grooves 60 in the first surface 52 of the sealing portion 38 and the annular raised rings 48 on the second radial face 44 are functional to ensure that pressurized fluid is not trapped between the buffer seal 18 and the radial lip seal 20 when the pressure in the fluid chamber 34 reduces. The annular raised rings 48 serve during high pressure to provide smaller areas of contact on the second face 44 so that the forces created by the pressure acting on the opposed side are more heavily concentrated.

By having the second surface 54 of the sealing portion 38 at an acute angle of preferably less than thirty degrees with respect to the reference axis 23, the tendency of the sealing portion 38 to extrude outwardly is substantially eliminated. The backup ring 19 provides further assurance that the sealing portion 38 does not extrude outward.

The wear strip 22 is used to provide a surface that the shaft 12 can slide relative to in order to reduce sliding friction. It is recognized that in many arrangements the wear strip 22 is not used or is located in a different location. Additionally, the buffer seal 18 of the subject invention could be used with other seal arrangements or in some applications by itself.

What is claimed is:

1. A buffer seal defining a reference axis and being adapted to be disposed in a groove of a housing to prevent high pressure from passing between the buffer seal and a shaft disposed therethrough, the buffer seal comprising:

a body portion having an outer peripheral portion that is parallel with the reference axis and having a plurality of grooves defined therein parallel to the reference axis and spaced from one another about said outer peripheral portion, an inner peripheral portion, a first radial face and a second radial face;

a sealing portion connected to the inner peripheral portion of the body portion, the sealing portion having a first surface perpendicular to the reference axis and spaced in an axial direction away from the first radial face of the body portion to form a shoulder, and a plurality of grooves defined in said first surface that extend radially outwardly and are spaced from one another around the first surface, and a second surface oriented at an acute angle with respect to the reference axis and the apex of the formed angle between the first and second surfaces being the closest point to the reference axis;

wherein said buffer seal includes a groove defined in the inner peripheral portion of the body portion at a location adjacent to the second radial face of the body portion and the second surface of the sealing portion.

2. The buffer seal of claim 1 wherein the apex of the formed angle is at the point of intersection between the first and second surfaces.

3. The buffer seal of claim 1 wherein a third surface is disposed on the sealing portion between the first and second surfaces, the intersection of the second and third surfaces of the sealing portion being at a location generally adjacent the first surface of the sealing portion.

4. The buffer seal of claim 1 wherein the grooves on the first surface of the sealing portion have a depth with a bottom surface and the bottom surface of the respective grooves are closer to a plane defined by the first surface of the sealing portion than the point of intersection between the second and third surfaces of the sealing portion.

5. The buffer seal of claim 1 including spaced apart annular raised rings disposed on the second radial face.

6. The buffer seal of claim 1 in combination with a backup ring, the back up ring being of a size sufficient to be disposed in the groove of the body portion.

7. The buffer seal of claim 1 wherein the angle between the second surface of the sealing portion and the reference axis is preferably less than thirty degrees.

* * * * *